(12) United States Patent
Kreuch et al.

(10) Patent No.: US 8,332,359 B2
(45) Date of Patent: Dec. 11, 2012

(54) EXTENDED SYSTEM FOR ACCESSING ELECTRONIC DOCUMENTS WITH REVISION HISTORY IN NON-COMPATIBLE REPOSITORIES

(75) Inventors: Robert M. Kreuch, Bothell, WA (US); Michael Seaman, Impington (GB); Roger G. Bacalzo, Kirkland, WA (US); Grace Smith, Kirkland, WA (US); Eric L. Edeen, Kirkland, WA (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 12/181,234

(22) Filed: Jul. 28, 2008

(65) Prior Publication Data

US 2010/0023562 A1    Jan. 28, 2010

(51) Int. Cl.
*G06F 17/30* (2006.01)
(52) U.S. Cl. ....................................................... 707/638
(58) Field of Classification Search .......... 707/610–638, 707/999.203
See application file for complete search history.

(56) References Cited

U.S. PATENT DOCUMENTS

| | | | |
|---|---|---|---|
| 6,493,731 B1 | 12/2002 | Jones et al. | |
| 6,839,843 B1 | 1/2005 | Bacha et al. | |
| 7,280,995 B1* | 10/2007 | Sedlar | 1/1 |
| 2002/0152210 A1 | 10/2002 | Johnson et al. | |
| 2004/0221232 A1 | 11/2004 | Morgan | |
| 2005/0262047 A1 | 11/2005 | Wu et al. | |
| 2006/0080316 A1 | 4/2006 | Gilmore et al. | |
| 2006/0085406 A1 | 4/2006 | Evans et al. | |
| 2006/0136502 A1 | 6/2006 | Williams et al. | |
| 2006/0195491 A1 | 8/2006 | Nieland et al. | |
| 2006/0294077 A1 | 12/2006 | Bluhm et al. | |
| 2007/0078900 A1 | 4/2007 | Donahue et al. | |
| 2008/0077586 A1* | 3/2008 | Lam | 707/6 |
| 2009/0144342 A1* | 6/2009 | Sudhakar | 707/203 |

OTHER PUBLICATIONS

Aiken, Doretha, "U.S. Environmental Protection Agency Electronic Records/Document Management System Requirements," SRA International, Inc., (Jul. 31, 2002) 74 pages.
Ground Control Presentation—Microsoft Certified Partner, retrieved from www.sundaybizsys.com (2007).

* cited by examiner

*Primary Examiner* — Belinda Xue
(74) *Attorney, Agent, or Firm* — Patterson & Sheridan, LLP (57) ABSTRACT

Methods, apparatus, and articles for creating a document revision history for a document imported into a first Electronic Document Management System (EDMS) from a second EDMS. Metadata and content from the second EDMS is "mirrored" within the first EDMS to create an artificial or mirrored revision history of a document within the first EDMS. Doing so allows users of the first EDMS to access any version of a document and its history, as though the document had always existed on the first EDMS. Content may be stored onto the first EDMS or a reference to the content may be stored instead. Rules may be developed to resolve conflicts between different document versions in the first and second EDMS.

25 Claims, 5 Drawing Sheets

EXTENDED SYSTEM FOR ACCESSING ELECTRONIC DOCUMENTS WITH REVISION HISTORY IN NON-COMPATIBLE REPOSITORIES

BACKGROUND OF THE INVENTION

1. Field of the Invention

Embodiments of the invention generally relate to managing documents stored in different Electronic Document Management Systems. More specifically, embodiments of the invention provide for accessing electronic documents with revision history from a non-compatible repository.

2. Description of the Related Art

Electronic Document Management System (EDMS) are used to store multiple versions of electronic documents so that users may access previous versions of a document. When a user creates a new version of a document, the EDMS may record additional data associated with the new version, commonly referred to as "metadata." Metadata may contain information such as who made changes, the date or time changes were made, and a new version number for the document. Moreover, metadata may be updated any time a document is accessed, viewed, or modified. Additionally, the EDMS may store content of the new version separately from prior versions, allowing each version to be accessed independently. Thus, the EDMS can provide a complete revision history for each document.

Typically, the format and type of metadata varies between different EDMS vendors. For example, one EDMS may store metadata labeled "Author," "Creation Date," and "Employee ID" for each new version, where another EDMS may store "Creator," "Date," and no corresponding field for employee ID. Further, an EDMS may allow users to define metadata describing various features or history of a given document. For example, an EDMS may allow users to define document categories or document types, specify access restrictions or other security related attributes, etc. Regardless of the particular EDMS, the metadata and content changes associated with each version may provide a broad variety of information related to the history of a given document, along with a copy of each version.

Additionally, an EDMS typically allows users to check-out and check-in a document, as well as export a complete version history for a document (i.e., a copy of each version of a given document along with the metadata associated with that document). Similarly, an EDMS may allow a user to import a document. However, when importing a document, the EDMS typically creates a new, essentially blank history for the imported document—setting a newly imported document to be the initial version. Thus, even if that same document has a history (metadata and other versions) stored on another EDMS, that history typically remains unknown to the importing EDMS.

SUMMARY OF THE INVENTION

One embodiment of the invention includes a method of generating a document revision history for versions of a document managed by a first electronic document management system (EDMS). The method may generally include exporting, from the first EDMS, metadata describing a first document revision history for the versions of the document. The first document revision history is in a format used by the first EDMS and describes an actual history of that document in the first EDMS. The method may also include generating, from the first document revision history, a second document revision history in a format used by a second EMDS. The second document revision history provides an artificial revision history mirroring the actual revision history. The method may further include importing the second revision history into a repository managed by the second EDMS and importing the versions of the document into the repository managed by the second EDMS.

Another embodiment of the invention includes a computer-readable storage medium containing a program, which, when executed by a processor performs an operation to generate a document revision history for versions of a document managed by a first electronic document management system (EDMS). The operation may generally include exporting, from the first EDMS, metadata describing a first document revision history for the versions of the document and generating, from the first document revision history, a second document revision history in a format used by a second EMDS. The first document revision history is in a format used by the first EDMS and describes an actual history of that document in the first EDMS. And the second document revision history provides a mirrored revision history mirroring the actual revision history. The operation may also include importing the second revision history into a repository managed by the second EDMS and importing the versions of the document into the repository managed by the second EDMS.

Still another embodiment of the invention includes a system having a processor and a memory containing a second electronic document management system (EDMS) application. The second EDMS application may be configured to generate a document revision history for versions of a document managed by a first EDMS. The second EDMS application may generally be configured to export, from the first EDMS, metadata describing a first document revision history for the versions of the document and generate, from the first document revision history, a second document revision history in a format used by a second EMDS. The first document revision history is in a format used by the first EDMS and describes an actual history of that document in the first EDMS. And the second document revision history provides a mirrored revision history mirroring the actual revision history. The second EDMS application may be further configured to import the second document revision history into a repository managed by the second EDMS and import the versions of the document into the repository managed by the second EDMS.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques for generating a document revision history for a document imported into a first EDMS from a second EDMS. In one embodiment, the first EDMS may be configured to generate an artificial or mirrored revision history for a document from the actual revision history of that document in the second EDMS. Metadata and content from the second EDMS is mirrored within the first EDMS. The mirrored revision history may include a set of document versions as well as metadata describing a variety of attributes of the document (or document versions). Doing so allows users of the first EDMS to access multiple versions of a document (and its history) as though that document was originally created, revised, and stored by first EDMS.

As stated, the mirrored revision history of a document in the first EDMS may reflect an actual history of that document in the second EDMS. In one embodiment, when an electronic document is imported into the first EDMS, metadata may be mapped from the second EDMS to the first EDMS. For example, information from an "Author" field in the second EDMS might be mapped to a "Creator" field in the first EDMS. Further, the first EDMS may apply rules for resolving conflicts where different versions of the same document exist in the first EDMS and the second EDMS. For example, if the first EDMS already contains a more recent version of a document to be imported, then a mapping rule may specify this document should not be imported from the second EDMS.

Additionally, along with the artificial revision history, the document versions may be imported into the first EDMS. For example, in one embodiment, the first (or native) EDMS may store a copy of each version of the document. Alternatively, the native EDMS may store a unique identifier assigned to a document (or version of a document) by the second (or foreign) EDMS. In such a case, when a user requests access to a document, the native EDMS may identify whether an actual copy of the requested document is available. If so, that document is returned in response to the request. Otherwise, the native EDMS may use the identifier to retrieve the document from the foreign EDMS. Generally, such an operation is transparent to the requesting user. Thus, using references allows the native EDMS to retrieve and present content to the user that is physically stored in the foreign EDMS.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Additionally, for simplicity, EDMS systems are described herein as storing multiple versions of a "document" (along with document metadata). And the term "document" may refer to a particular version or to a document family representing multiple versions of a document. The document metadata may include information describing a document such as a name, version number, title, author, creation and/or revision dates, and the like. Further, EDMS systems may be used to store a broad variety of information including, e.g., text-files, word-processing documents, spreadsheets, markup-documents (e.g., HTML or XML markup), database objects, video, audio, and digital images, etc. Thus, the use of the term "document" is used to refer broadly to any of these (or other) forms of electronic content and metadata stored by an EDMS system.

Figure 1:
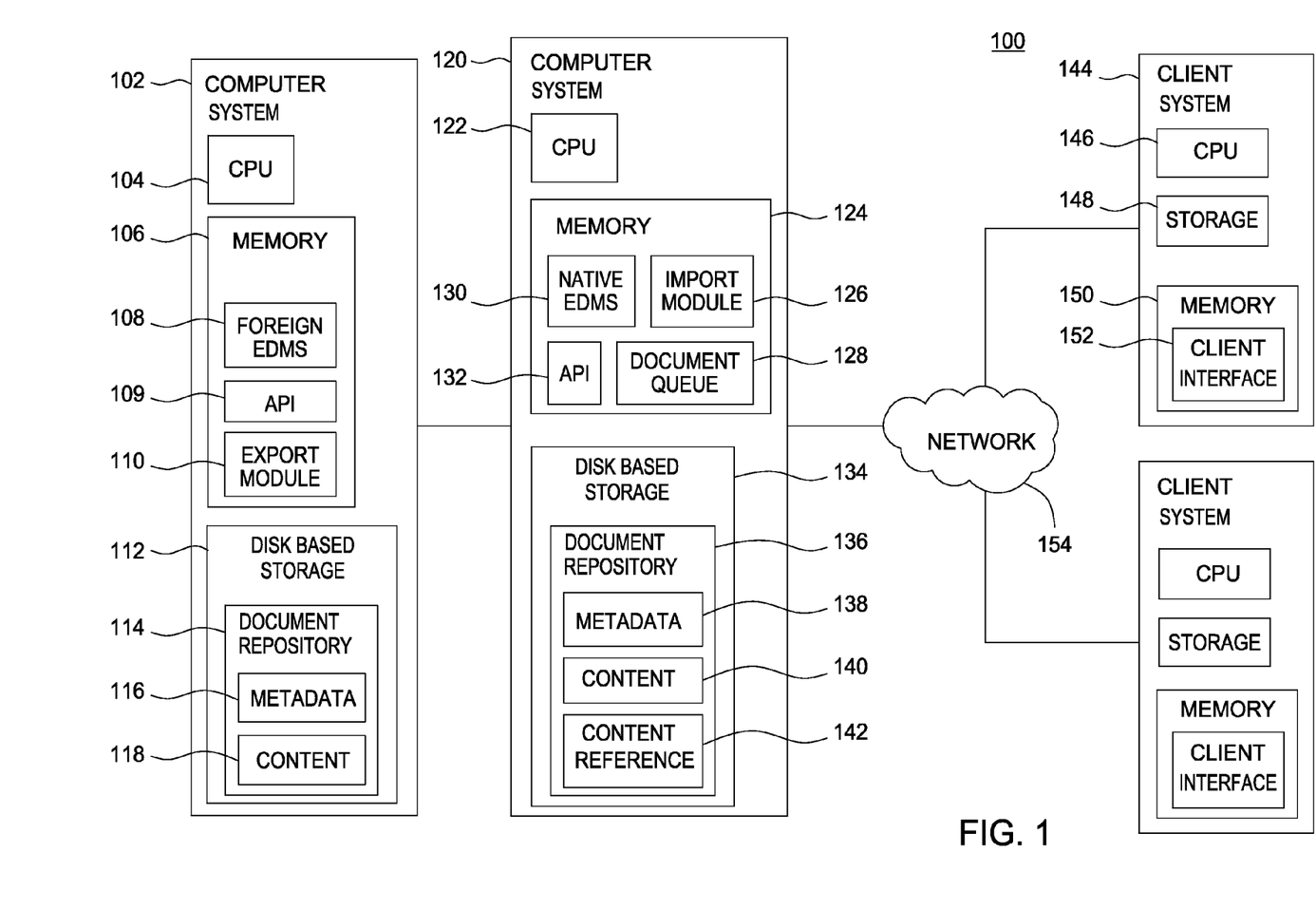
FIG. 1 is a block diagram illustrating a computing environment that includes two computer systems, each with a separate EDMS, according to one embodiment of the invention.

FIG. 1 is a block diagram 100 illustrating a computing environment that includes a first computer system 120 and a second computer system 102, each with a respective EDMS 108 130, according to one embodiment of the invention. As shown, computer system 120 generally includes a central processing unit (CPU) 122 connected by a bus to memory 124 and disk based storage 134. CPU 122 represents one or more programmable logic devices that perform all the instructions, logic, and mathematical processing in a computer. For example, CPU 122 may represent a single CPU, multiple CPUs, a single CPU having multiple processing cores, and the like. Storage 134 stores application programs and data for use by computer system 101. Storage 124 may be hard-disk drives, flash memory devices, optical media and the like. Computer system 120 may be connected to a data communications network 154 (e.g., a local area network, which itself may be connected to other networks such as the internet). Additionally, the computer system 120 may include input/output devices such as a mouse, keyboard and monitor (not shown) as well as a network interface used to connect computer system to the network 154.

As shown, the memory 124 includes a native EDMS 130, an import module 126, an API 132 and a document queue 128. In one embodiment, the native EDMS 130 provides a software application configured to manage documents stored in a document repository 136. For example, native EDMS 130 may be configured to store, update, and retrieve documents from the document repository 136 in response to user requests. Additionally, the native EDMS 130 may be configured to capture metadata reflecting document access or revisions as well as store multiple versions of a given document. Application programming interface (API) 132 may provide an external interface to the functions of the native EDMS 130 used to process and transfer data between the document repository 136 and other applications and computer systems. That is, developers may use the API 132 to develop programs, scripts, or other applications to communicate with the native EDMS 130. For example, the API 132 may be used to develop plug-ins to integrate the functionality provided by EDMS with other applications (e.g., a word processing application).

In one embodiment, the import module 126 provides a component of the EDMS 130 used to import documents into the document repository 136. Once imported, users may check-out and check-in a given document as well as manage and store multiple versions of a document and document metadata, stored in document repository as metadata 138. Metadata 138 describes the history of the document, such as who modified or accessed the document along with any user-defined attributes for a given document (or family of documents).

As shown, storage 134 includes the document repository 136. In one embodiment, the document repository 136 may be used to store each version of a document (and metadata) managed by the EDMS 130. For example, the document repository 136 may be implemented as a relational database used to store document metadata and version information, and a file system used to store multiple versions of a document. Illustratively, document repository 136 also includes metadata 138. As stated, metadata 138 may describe anything about a given document captured by the EDMS 130, including, e.g., document description data such as the most recent author and the last revision date. The document repository 136 may also include content 140 of a given document or a content reference 142 to an identifier of a document in another system (e.g., a foreign EDMS 108 of computer system 102). In one embodiment, the native EDMS 130 may use a given content reference and the API 132 to retrieve content 118 managed by the foreign EDMS 108 and display that content to a client interface 152 as though it were stored by the document-repository 136. Illustratively, the presence of a reference to content in EDMS 108 in document repository 136 is represented as the content reference 142.

Like computer system 120, computer system 102 also includes a central processing unit (CPU) 104 connected by a bus to a memory 106 and a disk based storage 112. As shown, the memory 106 includes a foreign EDMS 108, an export module 110 and an API 109. Similar to native EDMS 130, the foreign EDMS 108 may provide a software application configured to manage documents stored in a document repository 114. Thus, the foreign EDMS 108 may be configured to provide functionally similar to that of the native EDMS 130. For example, the foreign EDMS 108 may also be configured to store, update, and retrieve documents from the document repository 114 in response to user requests. Additionally, the foreign EDMS 108 may be configured to capture metadata reflecting document access or revisions as well as store multiple versions of a given document, and API 109 may provide an external interface to the functions of the foreign EDMS 108.

Note however, one of ordinary skill in the art will recognize that the terms "foreign" EDMS and "native" EDMS are used to generally distinguish one relative to the other. Thus, as used herein the term "foreign" EDMS generally refers to an EDMS from which a document version history is exported (i.e., an EDMS with an actual document revision history for a given document) and the native EDMS generally refers to an EDMS to which a document version history is imported (i.e., an EDMS with a mirrored version history mirroring the actual version history in the foreign EDMS).

The memory 106 also includes an export module 110. In one embodiment, export module 110 may be used to export documents from the document repository 114 to the document queue 128 of the computer system 120. Once in document queue 128, the import module 126 may be used to import those documents into the document repository 136 of the computer system 120 as well as create a mirrored revision history for each imported document. The mirrored revision history may include a copy (or reference to) each version of the document present in the foreign EDMS 108 as well as document metadata corresponding to the actual metadata generated the foreign EDMS 108 during a document's lifespan.

Disk based storage 112 also includes the document repository 114 used to store the content managed by the foreign EDMS 108. The repository 114 may include metadata 116 containing document description data, such as the most recent author and the last revision date. The repository 114 may also include the content 118 of each document managed by foreign EDMS 108. In one embodiment, the metadata 116 is used to create a mirrored revision history for documents exported from foreign EDMS 108 and imported to native EDMS 130.

FIG. 1 also shows a client system 144 having a CPU 146, a storage space 148, and a memory 150. Illustratively, the memory 144 stores a client interface 152 allowing users to access the native EDMS 130 of a computer system 120 over a network 154. Users may view and edit documents via the client interface 152. One of ordinary skill in the art will recognize many other methods for viewing documents exist, such as using a web browser, an application program or using a terminal located at the computer system 120.

Figure 2:
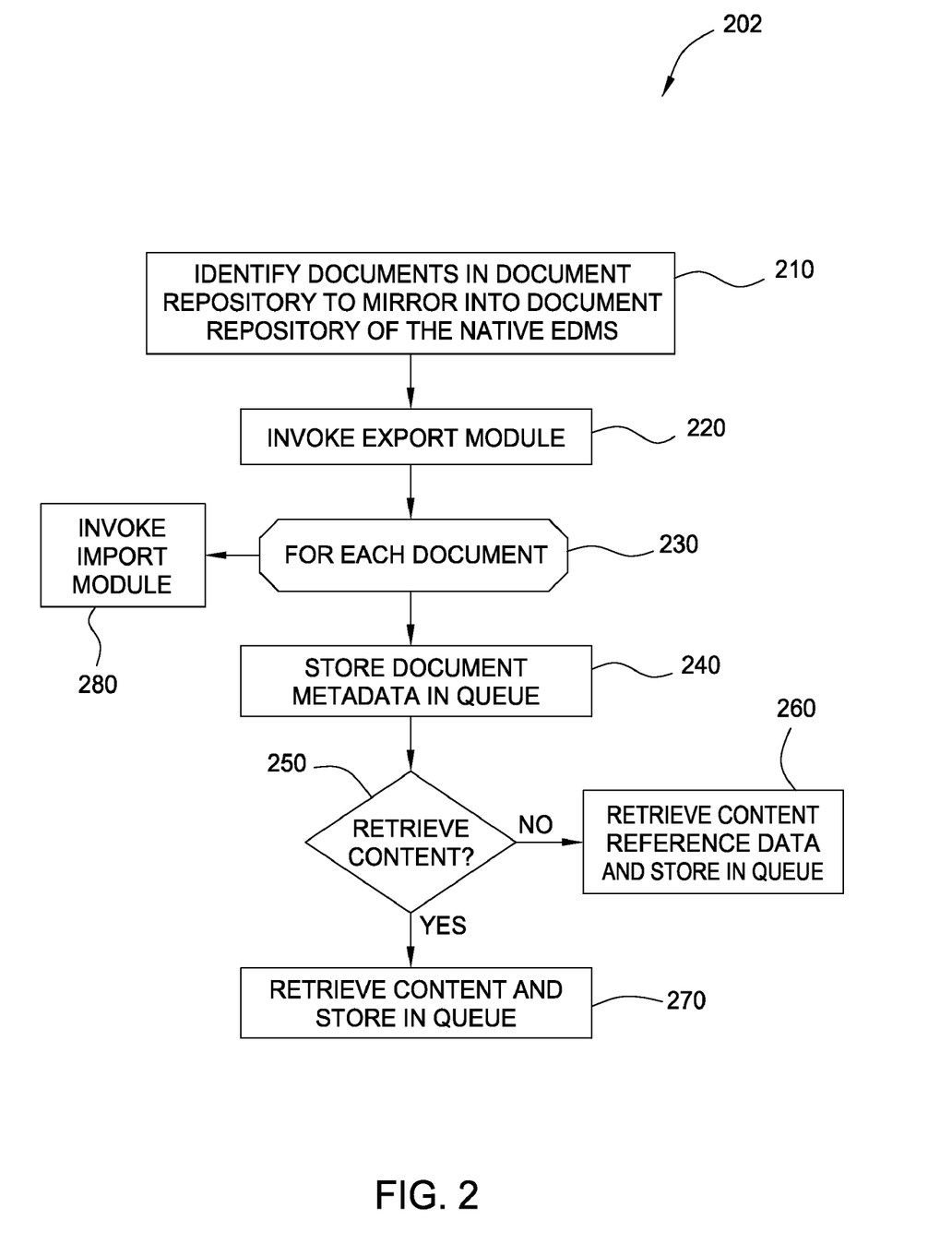
FIG. 2 illustrates a method for exporting a plurality of documents from a first EDMS, according to one embodiment of the invention.

FIG. 2 illustrates a method 202 for exporting a plurality of documents from a first EDMS (e.g., foreign EDMS 108), according to one embodiment of the invention. In one embodiment, method 202 represents operations performed by the export module 110. As shown, the method 202 begins at step 210, where a selection of documents from the foreign EDMS 108 is specified to be imported into the document repository 136 of the native EDMS 130. For example, a user may select to import all documents changed or added to the foreign repository since a previous export. Of course, one of ordinary skill in the art will recognize that other methods may be used to identify a selection of documents, including by a user or other components, such as identification by the native EDMS 130 or import module 126. For example, the import module 126 may be configured to identify a set of documents to be imported on a periodic basis.

At step 220, the export module 110 is invoked. In one embodiment, the export module 110 may be invoked by the native EDMS 108. In such a scenario, e.g., the native EDMS 108 may be configured to invoke functions provided by the API 109 of the foreign EDMS to access a set of documents (and document metadata) to be imported. At step 230, a loop is performed for each document identified at step 210. At step 240, the export module 110 may store the document metadata 116 in a document queue 128 of computer system 120. At step 250, if the user is exporting both actual documents and document metadata, then the document versions are also stored into the document queue 128 (step 270). However, if a content reference 142 (i.e., a unique identifier used to identify a document in the foreign EDMS) is used instead of actual content, then the method 202 proceeds to step 260 where the export module 110 retrieves data used to construct a content reference 142 in the document repository 136 of the computer system 120. That is, the export module 110 may be configured to copy a reference of content to be copied into the native EDMS 130. Subsequently, during an import process, the native EDMS may copy the content corresponding to the reference to the native repository 136. For example, EDMS 108 may assign a unique identifier to each document (or version of a document). In such a case, the export module 110 may provide the identifier for a given document, in lieu of the actual document. Further, in one embodiment, the native EDMS 130 may create a mirrored revision history from the exported metadata and store the identifiers associated with a given document (or version of a document). Once the revision history is created for an exported document, the native EDMS 130 may then invoke functions provided by API 109 to access a document represented in the mirrored revision history using a document identifier assigned by the foreign EDMS 108. At step 280, once the documents selected at step 210 have been exported, the import module 126 of native EDMS 130 may be invoked. That is, once the export module 110 of the foreign EDMS 108 exports a set of documents, document metadata and/or document identifiers to the document queue, the native EDMS 130 may be configured to import that set of documents as well as to create a mirrored revision history for each document being imported.

Figure 3:
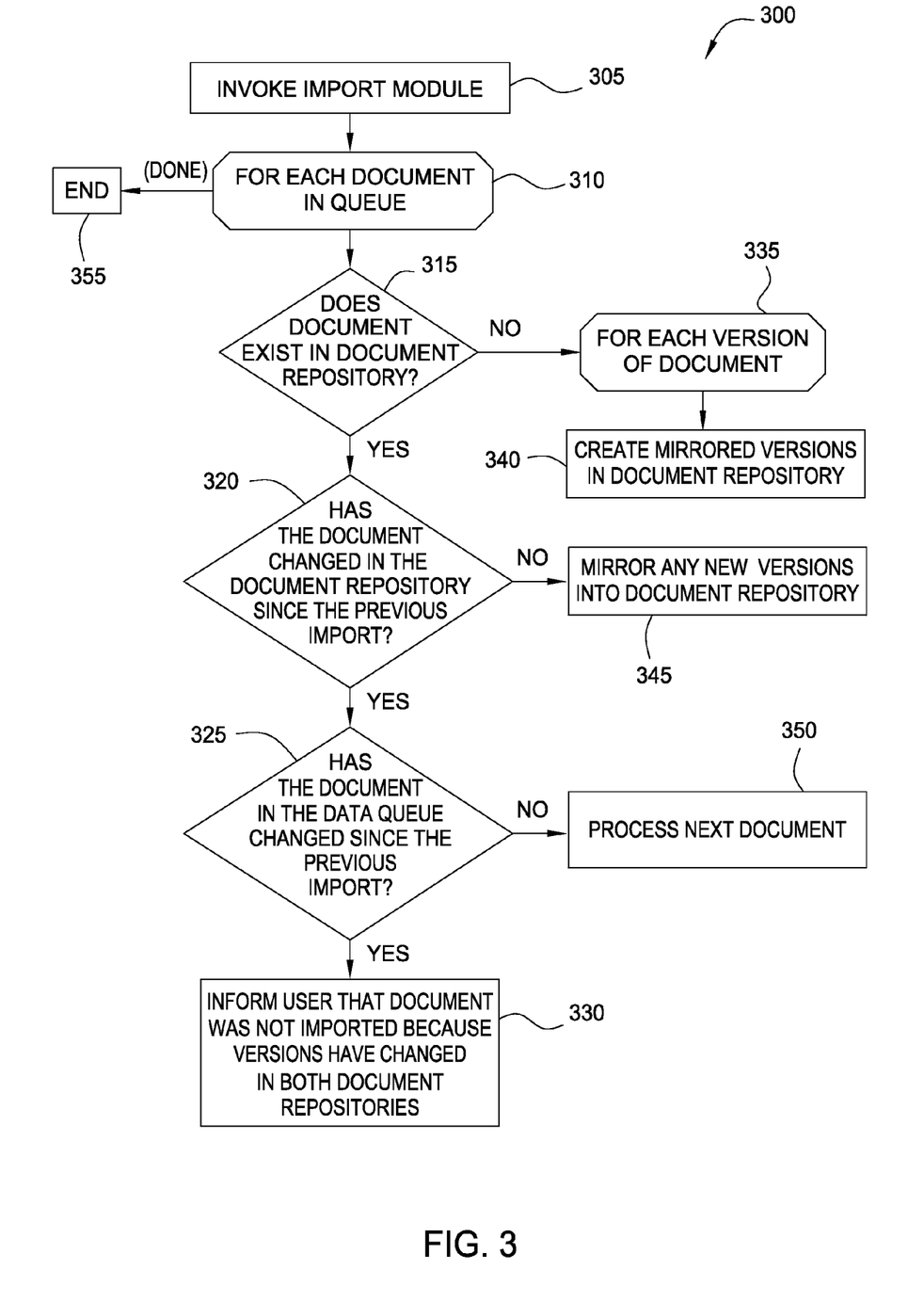
FIG. 3 illustrates a method for creating an artificial revision history for a plurality of documents imported into a second EDMS, according to one embodiment of the invention.

FIG. 3 illustrates a method 300 for creating a mirrored revision history for a plurality of documents imported into a second EDMS (e.g., native EDMS 130), according to one embodiment of the invention. In one embodiment, method 300 represents operations performed by the import module 126. As shown, the method 300 begins at step 305, where the import module 126 is invoked by the native EDMS 130. For example, the import module 126 may be configured to invoke API functions provided by the native EDMS 130 to store documents (or reference to documents) as well as to construct a revision history mirroring the actual revision history of a document exported from the foreign EDMS 108. At step 310, a loop is performed (steps 315-330) for each version of a document (and the associated metadata) exported from the foreign EDMS 108. In one embodiment, each import item in the queue may represent multiple versions of a document (along with document metadata) exported from the foreign EDMS 108.

At step 315, the import module 126 determines whether a current document already exists in the document repository 136. That is, the import module 126 determines whether a copy of a document exported from the foreign EDMS 108 already exists in the native EDMS 130. If not, then at step 335, the import module 126 creates a "mirrored" version of the document in the document repository 136 (step 340) for each version of the document exported from the foreign EDMS 108. Further, the import module 126 may be configured to generate a mirrored revision history for the document versions in a metadata format appropriate for the native EDMS 130. As stated, the mirrored revision history in the native EDMS 130 mirrors that of the actual revision history generated during a document's lifetime in the foreign EDMS. The mirroring process is described in more detail in conjunction with a discussion of FIG. 5.

Returning to step 315, if the import module 126 determines that a document currently being processed is present in the document repository 136, at step 320, the import module 126 may be determine whether any changes have been made to the copy of the document in the document repository 136 since last being imported. That is, the import module 126 determines if, after previously being imported into native EDMS 130, the document was modified by users of the native EDMS 130. If not, then at step 345, the import module 126 may mirror any new versions of the document in the document repository 136 and update the artificial revision history for that document in the native EDMS 130.

Otherwise, if the document has been modified by users of the native EDMS 130 since last being imported, at step 325, the import module 126 may determine whether that document has also been changed by users of the foreign EDMS 108 after last being exported. That is, the import module 126 may determine whether the document has been changed in both the foreign EDMS 108 and the native EDMS 130 after previously being imported into the native EDMS 130 and having a mirrored revision history created. If not, then at step 350, the method 300 returns to step 310 to process another document. Thus, if the document has only been modified by users accessing the document through the native EDMS 130 after being imported, the document history based on events occurring in the foreign EDMS 108 remains unchanged. Further, in this scenario, the mirrored revision history of the document in the native EDMS 130 is the same as the actual revision history of that document in the foreign EDMS 108, as any updates to the document, versions, or metadata have occurred through users accessing the document through the native EDMS 130. That is, users of the native EDMS have effectively added actual revision history (or new document versions) to the mirrored revision history created for a given document during a prior import process.

Otherwise, if the document has been modified both in the foreign EDMS 1230 and the native EDMS 130, then at step 330, the user may be notified to resolve the conflict between changes. Alternatively, the system may include default rules to overwrite portions of document history, or document versions, effectively selecting the changed history and versions for a given document from either the native EDMS 130 or the foreign EDMS 108. At step 355, after each document has been processed by the import module 126, the method 300 terminates.

Figure 4:
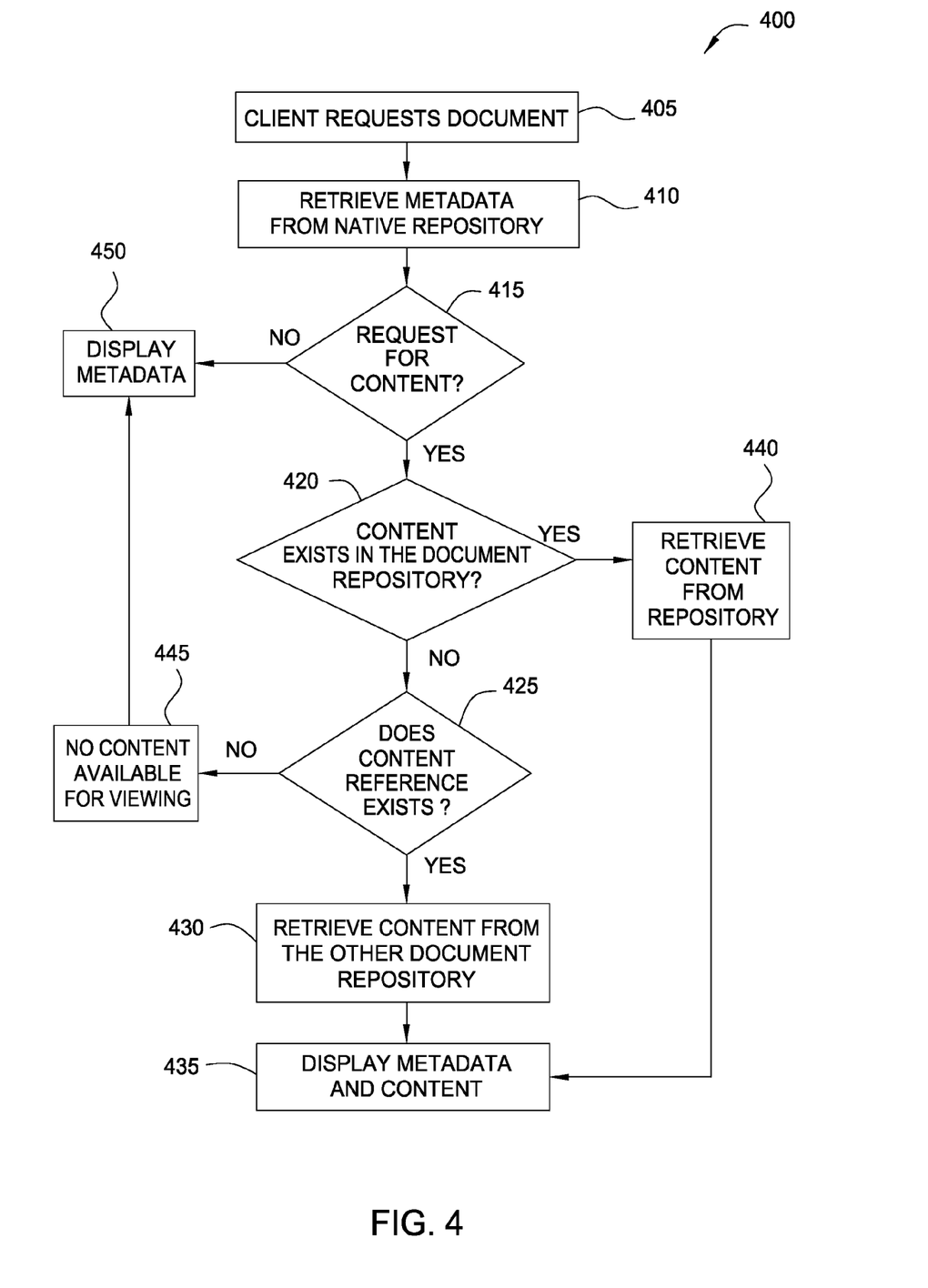
FIG. 4 is flow diagram 400 illustrating a method for a user to retrieve a document having an artificial revision history in an EDMS, according to one embodiment of the invention.

FIG. 4 is flow diagram 400 illustrating a method for a user to retrieve a document having a mirrored revision history in an EDMS according to one embodiment of the invention. As shown, the method 400 begins at step 405, where a user requests a document (or document metadata) through a client interface 152. For example, the client interface 152 may allow a user to search for content from the document repository of an EDMS by specifying metadata attributes. Similarly, the EDMS may present a list of available documents or the user may enter the name (or other identifier) of a desired document. Regardless of the mechanism used to request a document, at step 410, the client 152 may retrieve metadata 138 from the document repository 136 associated with requested document. For example, EDMS may store metadata indicating a name and location of the requested document within a file system used by document repository 136. At step 415, if the request is for just document metadata, the client interface 152 displays the document metadata 138 (step 450). For example, an administrator may desire to retrieve a list of versions of a given document or a list of authors who modified a document.

Typically, a user may request to check-out (or just view) a particular document. For example, a word-processing application may be used to check-out a document. The document may then be modified, and checked back into the EDMS. At step 420, if the user requests to check-out a document, then the EDMS may determine whether the actual content of the document is stored in the document repository 136. If the document is available, then the document is retrieved from the repository at step 440 and checked-out to the user.

Otherwise, if the document does not exist in the document repository 136, the EDMS may determine whether a reference to the document is available (step 425). For example, as described above, a native EDMS may store a reference used by a foreign EMDS to identify a document. In such a case, the native EDMS may be configured to invoke API functions provided by the foreign EDMS to obtain a copy of the document corresponding to the reference and check-out that document to the user. However, if the document is not available as actual content from the native repository or through a reference to the requested document in a foreign repository, then at step 445, the EMDS may respond to the user's request with an error indicating that the document is not available. Further, the EDMS may present the user with any available metadata related to the missing document.

Figure 5:
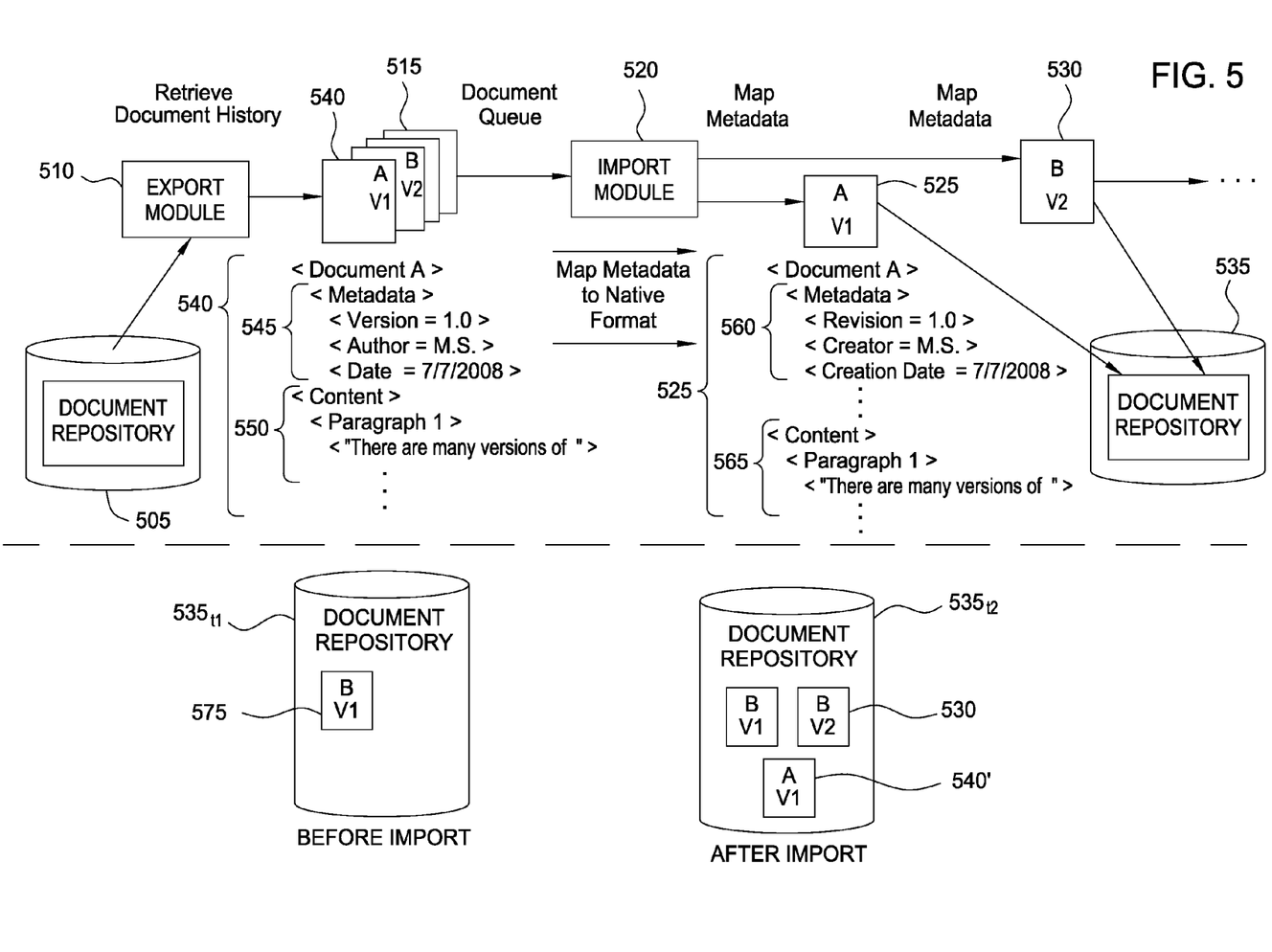
FIG. 5 illustrates an example of an artificial revision history being created for a document exported from a first EDMS and imported into a second EDMS, according to one embodiment of the invention.

FIG. 5 illustrates an example of a mirrored revision history being created for a document exported from a first EDMS and imported into a second EDMS, according to one embodiment of the invention. As shown, an export module 510 retrieves a group of documents from a document repository 505 managed by a first EDMS. The documents are stored in a document queue 515.

Specifically, document queue 515 includes a first version (V1) of document 540 (labeled "A"), and a second version (V2) of a document labeled "B." Illustratively, document 540 includes both a metadata portion 545 and a content portion 550. Once exported, the import module 520 may import documents from the queue 515 into a document repository 535 managed by a second EDMS. Further, using the techniques described above, a mirrored revision history may be created for a given document. In one embodiment, the mirrored revision history includes a history of document versions as well as metadata describing a variety of attributes of the document (or document versions). For example, FIG. 5 shows a document 525 (corresponding to version (V1) of document "A") and a document 530 (corresponding to version (V2) of document "B").

Document 525 is created by mapping the metadata 545 and content 550 of document 540. Accordingly, mapped document 525 includes a metadata portion 560 and a content portion 565. In this scenario, the metadata portion 560 corresponds to the metadata portion 545 and the content portion 565 corresponds to content portion 550. However, the metadata portion 560 is formatted for use by the second EDMS. That is, metadata portion 560 provides the mirrored revision history of documents 525 for use by the second EDMS. For example, the "Author" field in the metadata 545 corresponds to the "Creator" field metadata 560. Similarly, the "Para 1" field in the metadata 545 corresponds to the "Paragraph 1" in the metadata 560. Although this example displays a simple one-to-one mapping scheme, one of ordinary skill in the art will recognize other possibilities, such as one-to-many mapping schemes. Furthermore, metadata fields may be added or removed to suit the needs in a particular case.

Once the import module 520 generates the mirrored revision history for the document being imported into the second EDMS (e.g., document "A" 540), that document is stored in the document repository 535. The import module 520 then proceeds to the next document in the queue 515, as shown, version two (V2) of document "B".

FIG. 5 also shows a state of the document repository 535 both before and after the import of documents "A" and "B". Prior to the import process, a document repository $535_{t1}$ is shown in a state where the repository includes only document 575 (version 1 of document "B"). After the import process a document repository $535_{t2}$ still includes document 575, but now includes document 530 (representing a version 2 of document B) and document 540 (representing a version 1 of document "A").

Advantageously, embodiments of the invention provide a method for generating a document revision history for a document imported into a first EDMS from a second EDMS. In one embodiment, the first EDMS may be configured to generate an artificial or mirrored revision history for a document from the actual revision history of that document in the second EDMS. The mirrored revision history includes a history of document versions as well as metadata describing a variety of attributes of the document (or document versions). Metadata and content from the second EDMS is "mirrored" within the first EDMS. Doing so allows users of the first EDMS to access multiple versions of a document (and its history) as though that document was originally created, revised, and stored by first EDMS.

While the foregoing is directed to embodiments of the present invention, other and further embodiments of the invention may be devised without departing from the basic scope thereof, and the scope thereof is determined by the claims that follow.

What is claimed is:

1. A computer-implemented method of generating a document revision history for versions of a document managed by a first electronic document management system (EDMS), the method comprising, by a second EDMS:
    importing, from the first EDMS into a first location of the second EDMS, metadata describing a first document revision history for the versions of the document managed by the first EDMS, wherein the first document revision history comprises metadata attributes in a first format associated with the first EDMS and describes an actual revision history of the document;
    generating, from the metadata describing the first document revision history, a second document revision history comprising metadata attributes in a second format associated with the second EDMS, wherein the second document revision history provides a mirrored revision history mirroring the actual revision history, and wherein one or more metadata attributes in the second format are distinct from one or more corresponding metadata attributes in the first format;

importing the second document revision history from the first location into a repository managed by the second EDMS; and importing the versions of the document from the first location into the repository managed by the second EDMS.

2. The method of claim 1, wherein importing the versions of the document comprises storing a copy of each version of the document into the repository managed by the second EDMS.

3. The method of claim 1, wherein importing the versions of the document comprises storing a unique identifier that identifies each version of the document in the first EDMS.

4. The method of claim 1, further comprising:
prior to generating the second document revision history, determining that one or more of the versions of the document are stored in the second EDMS and determining that the document has not been modified by users of the second EDMS after previously being imported from the first EDMS.

5. The method of claim 1, further comprising:
prior to generating the second document revision history, determining that one or more of the versions of the document are stored in the second EDMS and determining that the document has been modified by users of the first EDMS and second EDMS after previously being imported; and
when importing the second document revision history from the first location into the repository managed by the second EDMS, overwriting at least a portion of an existing revision history associated with the one or more versions of the document stored in the second EDMS.

6. The method of claim 1, further comprising:
prior to generating the second document revision history, determining that one or more of the versions of the document are stored in the second EDMS and determining that the document has been modified by users of the first EDMS and second EDMS after previously being imported; and
when importing the second document revision history from the first location into the repository managed by the second EDMS, overwriting at least a portion of the second document revision history with an existing revision history associated with the one or more versions of the document stored in the second EDMS.

7. The method of claim 1, wherein generating the second document revision history comprises mapping one or more metadata attributes of the first document revision history to corresponding metadata attributes of the second document revision history.

8. The method of claim 7, wherein at least one of the one or more metadata attributes identifies at least one of a document author, a document type, a document creation date, a document version, and a document modification date.

9. A non-transitory computer-readable medium containing a program, which, when executed by a processor, performs an operation to generate a document revision history for versions of a document managed by a first electronic document management system (EDMS), the operation comprising, by a second EDMS:
importing, from the first EDMS into a first location of the second EDMS, metadata describing a first document revision history for the versions of the document managed by the first EDMS, wherein the first document revision history comprises metadata attributes in a first format associated with the first EDMS and describes an actual revision history of the document;

generating, from the metadata describing the first document revision history, a second document revision history comprising metadata attributes in a second format associated with the second EDMS, wherein the second document revision history provides a mirrored revision history mirroring the actual revision history, and wherein one or more metadata attributes in the second format are distinct from one or more corresponding metadata attributes in the first format;

importing the second document revision history from the first location into a repository managed by the second EDMS; and importing the versions of the document from the first location into the repository managed by the second EDMS.

10. The non-transitory computer-readable medium of claim 9, wherein importing the versions of the document comprises storing a copy of each version of the document into the repository managed by the second EDMS.

11. The non-transitory computer-readable medium of claim 9, wherein importing the versions of the document comprises storing a unique identifier that identifies each version of the document in the first EDMS.

12. The non-transitory computer-readable medium of claim 9, wherein the operation further comprises:
prior to generating the second document revision history, determining that one or more of the versions of the document are stored in the second EDMS and determining that the document has not been modified by users of the second EDMS after previously being imported from the first EDMS.

13. The non-transitory computer-readable medium of claim 9, wherein the operation further comprises:
prior to generating the second document revision history, determining that one or more of the versions of the document are stored in the second EDMS and determining that the document has been modified by users of the first EDMS and second EDMS after previously being imported; and
when importing the second document revision history from the first location into the repository managed by the second EDMS, overwriting at least a portion of an existing revision history associated with the one or more versions of the document stored in the second EDMS.

14. The non-transitory computer-readable medium of claim 9, wherein the operation further comprises:
prior to generating the second document revision history, determining that one or more of the versions of the document are stored in the second EDMS and determining that the document has been modified by users of the first EDMS and second EDMS after previously being imported; and
when importing the second document revision history from the first location into the repository managed by the second EDMS, overwriting at least a portion of the second document revision history with an existing revision history associated with the one or more versions of the document stored in the second EDMS.

15. The non-transitory computer-readable medium of claim 9, wherein generating the second document revision history comprises mapping one or more metadata attributes of the first document revision history to corresponding metadata attributes of the second document revision history.

16. The non-transitory computer-readable medium of claim 15, wherein at least one of the one or more metadata attributes identifies at least one of a document author, a document type, a document creation date, a document version, and a document modification date.

17. A system comprising:
a processor;
a memory containing an application of a second electronic document management system (EDMS) which when executed by the processor configures the processor to generate a document revision history for versions of a document managed by a first EDMS by performing an operation, by the second EDMS, comprising:
importing, from the first EDMS into a first location of the second EDMS, metadata describing a first document revision history for the versions of the document managed by the first EDMS, wherein the first document revision history comprises metadata attributes in a first format associated with the first EDMS and describes an actual revision history of the document,
generating, by the second EDMS and from the metadata describing the first document revision history, a second document revision history comprising metadata attributes in a second format associated with the second EDMS, wherein the second document revision history provides a mirrored revision history mirroring the actual revision history, and wherein one or more metadata attributes in the second format are distinct from one or more corresponding metadata attributes in the first format;
importing the second document revision history from the first location into a repository managed by the second EDMS, and
importing the versions of the document from the first location into the repository managed by the second EDMS.

18. The system of claim 17, wherein the repository comprises:
a relational database used to store the second document revision history; and
a file system used to store the versions of the document.

19. The system of claim 17, wherein importing the versions of the document comprises storing a copy of each version of the document into the repository managed by the second EDMS.

20. The system of claim 17, wherein importing the versions of the document comprises storing a unique identifier that identifies each version of the document in the first EDMS.

21. The system of claim 17, wherein the steps further comprise:
prior to generating the second document revision history, determining that one or more of the versions of the document are stored in the second EDMS and determining that the document has not been modified by users of the second EDMS after previously being imported from the first EDMS.

22. The system of claim 17, wherein the steps further comprise:
prior to generating the second document revision history, determining that one or more of the versions of the document are stored in the second EDMS and determining that the document has been modified by users of the first EDMS and second EDMS after previously being imported; and
when importing the second document revision history from the first location into the repository managed by the second EDMS, overwriting at least a portion of an existing revision history associated with the one or more versions of the document stored in the second EDMS.

23. The system of claim 17, wherein the steps further comprise:
prior to generating the second document revision history, determining that one or more of the versions of the document are stored in the second EDMS and determining that the document has been modified by users of the first EDMS and second EDMS after previously being imported; and
when importing the second document revision history from the first location into the repository managed by the second EDMS, overwriting at least a portion of the second document revision history with an existing revision history associated with the one or more versions of the document stored in the second EDMS.

24. The system of claim 17, wherein generating the second document revision history comprises mapping one or more metadata attributes of the first document revision history to corresponding metadata attributes of the second document revision history.

25. The system of claim 24, wherein at least one of the one or more metadata attributes identifies at least one of a document author, a document type, a document creation date, a document version, and a document modification date.

* * * * *